W. H. NESMITH.
GIN OR DELINTING GIN.
APPLICATION FILED APR. 5, 1918.
1,333,334. Patented Mar. 9, 1920.
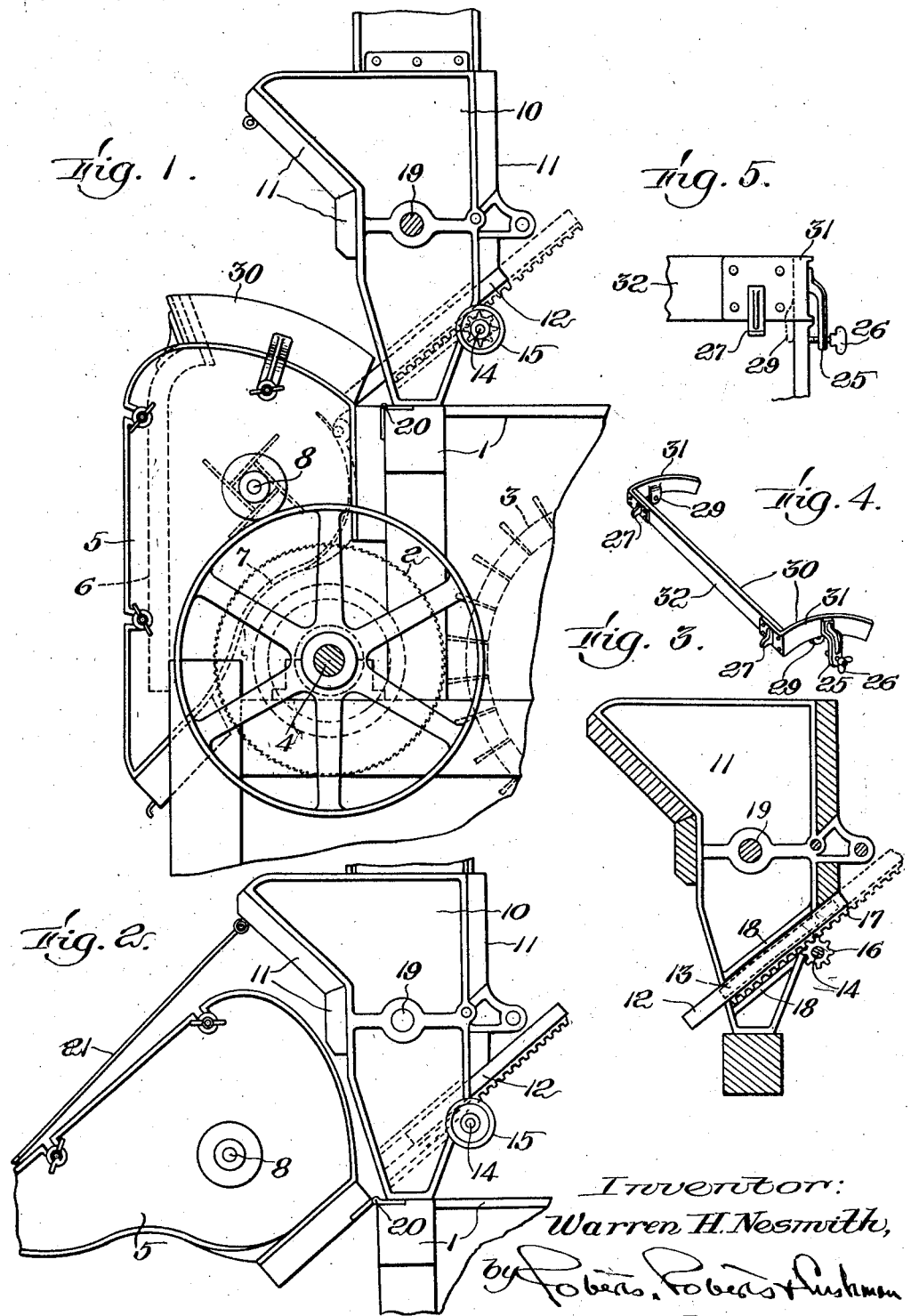
Inventor:
Warren H. Nesmith,
by Roberts, Roberts & Cushman
his Attorneys.

UNITED STATES PATENT OFFICE.

WARREN HINES NESMITH, OF HOUSTON, TEXAS.

GIN OR DELINTING-GIN.

1,333,334. Specification of Letters Patent. Patented Mar. 9, 1920.

Application filed April 5, 1918. Serial No. 226,811.

*To all whom it may concern:*

Be it known that I, WARREN H. NESMITH, a citizen of the United States of America, and resident of Houston, in the county of Harris and State of Texas, have invented new and useful Improvements in Gins or Delinting-Gins, of which the following is a specification.

This invention relates to cotton gins and delinting gins, and particularly to saw gins of the kind having a gratefall, so-called, and breast, together forming a roll-box into which the cotton seeds are delivered from a hopper feeder.

In gins of this kind it is desirable to have ready access to the saw cylinder for sharpening and cleaning the saws, replacing broken saws, etc. As gins of this class have been heretofore constructed it has not been possible to remove the saw cylinder without either removing the roll-box as a whole, including the gratefall and the breast, with the permanently attached breast-hopper, or removing the breast and its hopper from the gratefall, after which the gratefall is swung forward and upward on hinges to afford access to the saw cylinder.

When the breast is removed from the gratefall the seeds contained in the roll-box have to be removed. All the adjustments of the breast are disturbed and there is also considerable loss in the unlinted seeds which have been removed from the roll-box. There is also a loss of time for the reason that when the cylinder has been replaced in the linter and the gratefall restored to place the breast has to be reattached to the grateful and readjusted, and the roll-box has to be filled with fresh seed, all of which takes time and entails loss in the production of fiber. And if the breast and gratefall are removed from the machine together, time is lost and difficulties are encountered in reattaching the gratefall to the gin, with the saws projecting in proper position between the grates.

Moreover the feeder hoppers of gins as heretofore constructed have been provided with magnet-boards attached to the feeders by a hinge in fixed position with the result that the magnet-board interferes with the raising of the gratefall to give access to the saw cylinder. Access to the saw-cylinder to attend to the saws is required frequently to maintain efficiency of the gin, but considerable loss of lint and a more important loss of time results from having to dismantle the machine in order to get at the saw-cylinder.

Principal objects of the present invention are to provide for quick access to the saws without emptying feeder hopper or breast and to provide a new construction in which the hinged breast, grate, etc., can be swung clear of the saw-cylinder so as to permit the saw-cylinder to be removed without having to take off the large feeder hopper at the top of the gin, or to remove the breast or the roll-box as a whole, or the magnet-board, from the gin.

In the accompanying drawings,—

Figure 1 is a fragmentary side elevation of so much of a gin as is necessary to illustrate the invention;

Fig. 2 is a similar detail section showing the parts in another position;

Fig. 3 is a vertical section inside one of the ends of the feeder hopper;

Fig. 4 is a detail in perspective of the detachable breast hopper for the top of the roll-box; and Fig. 5 is a detail in front elevation showing the attaching means also illustrated in Fig. 4.

The construction of the frame 1, saw-cylinder 2, brush 3, and bearings and axis 4 for the saw-cylinder, may be the same as usual.

The roll-box comprises the usual heads 5, removable and adjustable front-board or breast 6, grate 7, and float-shaft 8, and may be the same as usual except that the hopper 30 at the top of the breast or roll-box is not permanently attached thereto but is a detachable structure presently mentioned in detail.

The feeder hopper may be of any desired or usual construction preferably comprising the end castings 10, back and side boards 11, and an inclined bottom 12, which as usual may be a board including bar-magnets 13 to prevent iron or steel foreign objects from entering the roll-box and injuring the saws. The hopper 10, 11, is attached firmly to the frame 1, and includes bearings for feeder shaft 19. The magnet board 12, operative in the position illustrated in Fig. 1, is preferably arranged to slide in ways 18 formed in the ends 10, and is provided with means for moving it backward and upward out of the way. As shown, this means may comprise a shaft 14 and hand wheel 15 for pinions 16 engaging with racks 17 on the under side of the magnet board 12 for moving the board 12 to the position shown in Fig. 2.

The gratefall 5, 7, is hinged as shown at 20. The construction and position of the end frames 11 is such as to permit the gratefall to be swung upward as shown in Fig. 2, when the magnet-board 12 is out of the way, and the gratefall may be held in this position by hooks 21.

As usual cotton or cotton-seed flowing down the board 12 is taken through the opening in the top of the roll-box 5, 6, 7, as fast as the gin disposes of the seed and the lint cotton. This opening is provided with a breast hopper 30.

As best shown in Fig. 4 according to the present invention this breast hopper is a detachable structure comprising end castings 31 having lugs 29 to take within the ends 5, and exterior clamp-irons 25, 25, and wing screws 26 for clamping the breast hopper 30, comprising the castings 31 and a front-board 32 screwed to the end castings 30, rigidly to the top of the breast. To make the structure more rigid, integral lugs 27, 27, may project from the front of the end castings 31.

When access to the saw-cylinder 2 is desired, the breast hopper 30 is removed by loosening the screws 26, the magnet board 12 is run back, and the gratefall and breast are then lifted to the position shown in Fig. 2, and held up by the hooks 21. The saw-cylinder 2 can then be rolled forward from its bearings as usual. As will be clear from the drawings, without removing the breast-hopper 30 and withdrawing the inclined bottom 12, the roll-box could not be swung out of the way sufficiently to admit of the removal of the saw-cylinder.

What I claim is:

1. A gin having a frame and bearings therein for its driven elements, a hinged gratefall and breast, a removable ginning element, a feeder-hopper fixed on said frame, and a breast-hopper adapted to be removed to permit the gratefall and breast to be lifted to an upper position out of the way of the ginning element.

2. A gin having a frame, a feeder-hopper fixed to the frame, and a removable saw-cylinder, a roll-box comprising a gratefall and a removable breast hinged to the frame, and a breast-hopper adapted to be removed from the roll-box without disturbing the breast to permit the roll-box to be swung upward on its hinge against the feeder-hopper to admit of the removal of the saw-cylinder.

3. A gin having a suitable frame, a rotary ginning element, a feeder-hopper mounted on the frame, a roll-box comprising a gratefall and breast pivoted on the frame, and an inclined bottom for the feeder hopper adapted to conduct the contents of the hopper to an opening in the top of the roll-box, and means for withdrawing said inclined bottom backwardly and upwardly whereby to permit the roll-box to be moved upwardly on its pivot for removal of the ginning element without emptying the contents of the roll-box or feeder-hopper.

4. A gin having a frame and a saw-cylinder, a roll-box comprising a gratefall and breast hinged for movement in respect to the saw-cylinder, a hopper-feeder mounted on the frame, an inclined sliding bottom for said hopper-feeder adapted to direct its contents into the top of the roll-box when the roll-box and inclined bottom are positioned operatively, in combination with means permitting said inclined bottom to be moved out of the way when the roll-box is lifted about its hinge-pivot.

5. A gin having a frame and saw-cylinder, a roll-box comprising a gratefall and breast hinged for movement in respect to the saw-cylinder, a hopper-feeder mounted on the frame, an inclined movable bottom for said hopper-feeder adapted to direct its contents into the top of the roll-box when the roll-box is positioned operatively, in combination with a breast hopper adapted to receive said contents when the parts are operatively positioned, said breast-hopper and inclined bottom being adapted to be removed to permit the roll-box to be swung upwardly to admit of the removal of said saw-cylinder.

6. A gin having in combination, a hinged gratefall and breast, a feeder-hopper comprising an inclined bottom board projecting at one side, and a hand-operated shaft and gearing for withdrawing said board within one side of the hopper and out of the way of the gratefall and breast when lifted to an inoperative position.

7. A removable breast-hopper for gins comprising end-pieces adapted to be clamped on the roll-box and connected together by another wall of said breast-hopper.

Signed by me at Houston, Texas, this 23rd day of March, 1918.

WARREN HINES NESMITH.